US011422613B2

(12) United States Patent
Khosrowpour et al.

(10) Patent No.: US 11,422,613 B2
(45) Date of Patent: Aug. 23, 2022

(54) METHOD TO ENHANCE SYSTEM POWER AND THERMAL LIMITS THROUGH SOFTWARE CONTROL FOR CONFIGURATIONS USING EXTERNAL MONITORS

(71) Applicant: Dell Products L.P., Round Rock, TX (US)

(72) Inventors: Farzad Khosrowpour, Pflugerville, TX (US); Jong Seo Lee, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/144,815

(22) Filed: Jan. 8, 2021

(65) Prior Publication Data

US 2022/0221926 A1 Jul. 14, 2022

(51) Int. Cl.
*G06F 1/3234* (2019.01)
*G06F 11/30* (2006.01)
*G06F 1/324* (2019.01)
*G06F 1/3231* (2019.01)

(52) U.S. Cl.
CPC ............ *G06F 1/3265* (2013.01); *G06F 1/324* (2013.01); *G06F 1/3231* (2013.01); *G06F 11/3062* (2013.01)

(58) Field of Classification Search
None
See application file for complete search history.

(56) References Cited

U.S. PATENT DOCUMENTS

| | | | | |
|---|---|---|---|---|
| 2015/0082061 A1* | 3/2015 | Ramirez | ............... | G06F 1/1632 713/323 |
| 2016/0048363 A1* | 2/2016 | North | .................... | G06F 1/1677 345/1.1 |
| 2021/0149485 A1* | 5/2021 | Koki | ..................... | G06F 1/1686 |

* cited by examiner

*Primary Examiner* — Christopher J Kohlman
(74) *Attorney, Agent, or Firm* — Norton Rose Fulbright US LLP

(57) ABSTRACT

An information handling system may use algorithms implemented in hardware or software for allocating system resources to prioritize applications based on user interaction with the information handling system. An information handling system may optimize the power consumption in an information handling system or electronic device by adjusting performance parameters that redirect available thermal and power headroom to applications that the user is interacting with. The information handling system may monitor user interaction with windows rendered by the information handling system, whether on an internal display or external display. For example, a refresh rate of a monitor displaying a rendered window with less interaction than other rendered windows may be reduced to reduce power consumption related to operation of that monitor. Additional thermal headroom of the information handling system may be used to improve responsiveness of rendered windows with which the user is interacting.

20 Claims, 4 Drawing Sheets

METHOD TO ENHANCE SYSTEM POWER AND THERMAL LIMITS THROUGH SOFTWARE CONTROL FOR CONFIGURATIONS USING EXTERNAL MONITORS

FIELD OF THE DISCLOSURE

The instant disclosure relates to information handling systems. More specifically, portions of this disclosure relate to an information handling system adjusting a parameter related to a thermal level or power level of a processing unit to prioritize certain rendered windows.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Poor thermal management in information handling systems can cause decreased performance due to throttling of the components in the information handling system and/or increased noise from cooling fans for the components. Information handling systems may generate more heat, and thus reach thermal management limits when under higher loads. One example situation that may result in a higher load on the components is when a user connects a mobile device via a wired or wireless connection to a display. When the user opens an application, a processing unit in the mobile device may overheat, causing a drop of frames or another type of degradation. The external display may result in additional required processing by the components of the information handling system to create and display images on that display. For example, the external display may operate at a higher resolution than the information handling system's built-in display (if there is one), which results in more work for the graphics processing unit.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

To prevent degradation, the information handling system may use algorithms implemented in hardware or software for allocating system resources to prioritize applications based on user interaction with the information handling system. An information handling system may optimize the power consumption in an information handling system or electronic device by adjusting performance parameters that redirect available thermal and power headroom to applications that the user is interacting with. The information handling system may monitor user interaction with windows rendered by the information handling system, whether on an internal display or external display. The information handling system may execute software in an operating system environment for determining the user interaction, determining the parameter adjustment based on the user interaction to modify allocation of resources in the information handling system, and/or adjusting the parameter that relates to the thermal or power levels of the processing unit. By determining the user interaction, the parameter adjustments, and/or other devices or components in a multi-device system, the information handling system may collect data such as indications of unused display(s), indications of active window(s), indications of inactive window(s), camera feedback, and other feedback and/or data.

In some embodiments, the information handling system may generate user profiles containing the parameter adjustments. The information handling system may select the electronic device(s) and/or component(s) in a multi-device system configuration to adjust a parameter such as, for example, a brightness level of a monitor to reduce power consumption. By adjusting the parameter with collected data such as the user interaction with rendered windows, managing thermal and power limits at a higher orchestration level may provide more flexibility, adaptability, and controllability by the information handling system. For example, the information handling system may adjust a monitor coupled to a docking station coupled to the information handling system while displaying rendered windows on the monitor and an internal display. Another advantage of the present invention may include the information handling system preventing performance and/or acoustic degradation for the information handling system and/or the electronic device. For example, by adjusting the brightness level of one or N monitors power and noise, such as fan noise, may be reduced. Another advantage of the information handling system as described is that the information handling system may expand its determining and adjusting beyond a single device system to a system configuration with one or more electronic devices and/or components.

In some embodiments, the information handling system may include intelligence from components connected to the information handling system to leverage collected data from a multi-device system configuration. By using artificial intelligence and machine learning in determining the user interaction, determining the parameter adjustment, and adjusting the parameter, the information handling system may further optimize the thermal and power levels of the processing unit. In certain embodiments, the information handling system may implement a feedback loop for adjusting the steps of determining and adjusting. Adjusting the steps may allow the information handling system to capture data from various sources such as the prior parameter adjustment, profiles, characterizations, statuses, and/or modifications in the system. The information handling system may then implement additional parameter adjustments for the processing unit in the information handling system, the electronic device, or both.

According to one embodiment, a method may include determining, by an information handling system, a user interaction with rendered windows; determining, by the information handling system, a parameter adjustment based, at least in part, on the user interaction; and/or adjusting, by the information handling system, a parameter based, at least in part, on the parameter adjustment, wherein the parameter adjustment reduces power consumption related to the display of at least one rendered window of the rendered windows.

In certain embodiments, determining the parameter adjustment may include determining a parameter adjustment to maintain responsiveness of a first rendered window of the rendered windows by reducing responsiveness of a second rendered window of the rendered windows based on the user interaction indicating a user is interacting with the first rendered window, and wherein the reducing responsiveness of the second rendered window reduces power consumption related to the display of the second rendered window. Further, the step of adjusting, by the information handling system, may include adjusting a second parameter of a second monitor displaying the second rendered window differently from a first parameter of a first monitor displaying the first rendered window. Additionally, the second parameter may be a second refresh rate of the second monitor, and adjusting the second parameter reduces the second refresh rate below a first refresh rate of the first monitor and reduces power consumption related to the display of the second rendered window.

According to another embodiment, adjusting the parameter may include adjusting a first brightness level of a first monitor based on a determination that the user interaction with a first rendered window displayed on the first monitor is less than the user interaction with a second rendered window displayed on a second monitor, and wherein the first monitor is an internal display of the information handling system.

According to a further embodiment, determining the user interaction may include monitoring a camera to determine whether a user's eye is not focused on a first rendered window of the rendered windows, and wherein the adjusting of the parameter comprises adjusting the parameter to reduce power consumption related to the display of the first rendered window. Additionally or alternatively, determining the user interaction may include monitoring a mouse cursor location or mouse click locations to determine the user is interacting with a first rendered window more than a second rendered window.

The method may be embedded in a computer-readable medium as computer program code comprising instructions that cause a processor to perform the steps of the method. In some embodiments, the processor may be part of an information handling system including a first network adaptor configured to transmit data over a first network connection of a plurality of network connections; a second network adaptor configured to transmit data over a second network connection of a plurality of network connections; a memory; one or more graphics processing units (GPUs) and one or more central processing units (CPUs), wherein one or more of the CPUs are coupled to one or more of the GPUs, the first network adaptor, the second network adaptor, and/or the memory.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
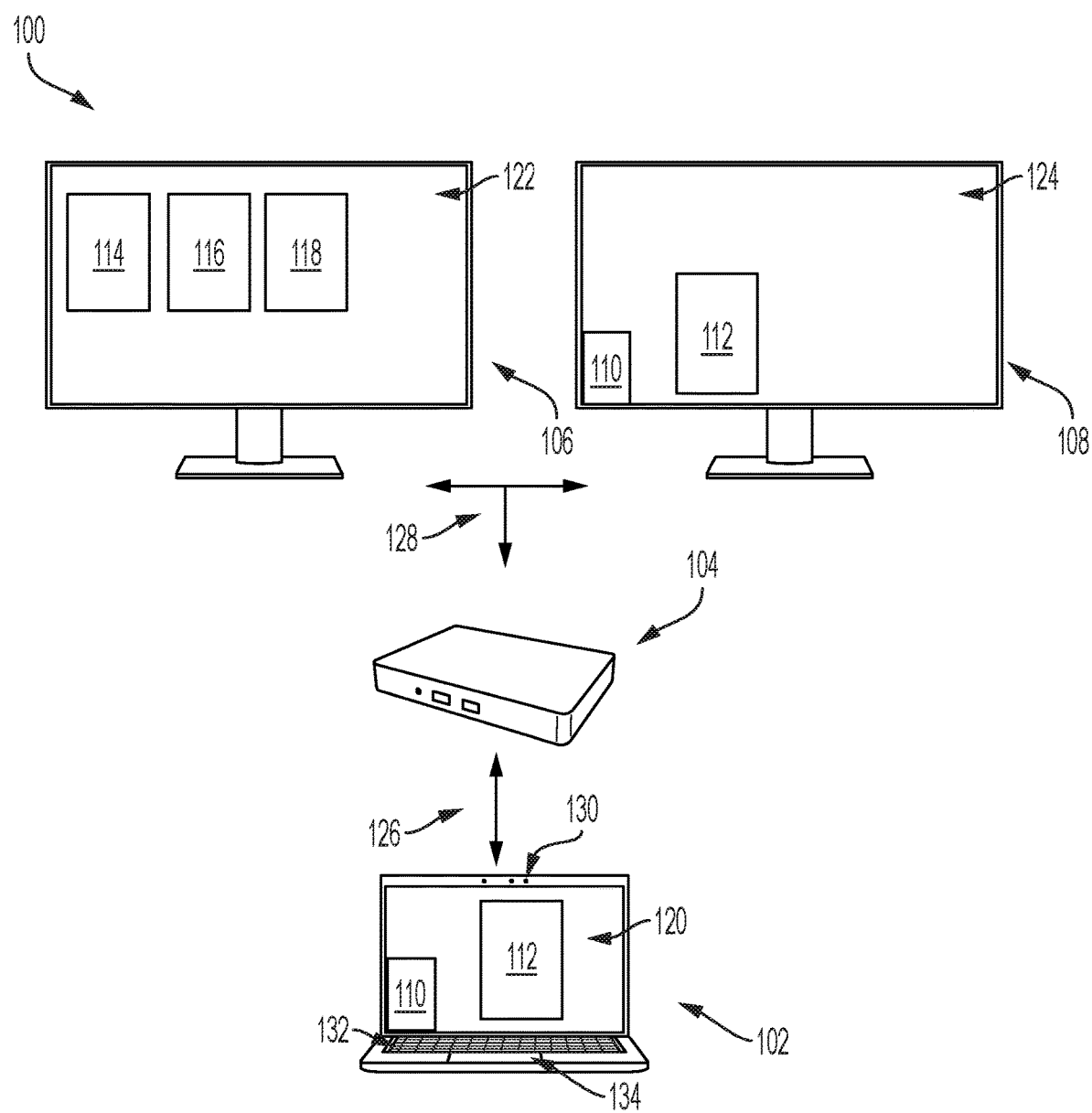
FIG. 1 an illustration of a system configuration with an information handling system such as a laptop, a docking station, and an external monitor according to some embodiments of the disclosure.

An information handling system may optimize the thermal design power of a processing unit of the information handling system or another electronic device by determining a user interaction, monitoring data, determining a parameter adjustment, and adjusting a parameter. The information handling system may monitor data such as the user interaction with rendered windows on one or more electronic devices and components. The data monitored may further include, but is not limited to, user interaction data such as the type of use, frequency of use, rate of change, or proximity and a system data such as the system configuration, available processing units, or other connected devices and components. In some embodiments, the information handling system may also monitor and collect data from various devices and components in a multi-device system configuration. With the collected data, the information handling system may create a profile from the user interaction and/or characterize the processing unit(s) in the information handling system or the electronic device(s) such as a graphics processing unit (GPU) or central processing unit (CPU).

After the information handling system interprets at least the user interaction with rendered windows, the information handling system may determine a parameter adjustment. The parameter adjustment may relate to a parameter in the information handling system or the electronic device(s), and the parameter may specifically be related to the display, GPU, or power. The information handling system may determine the type of parameter adjustment suitable to adjust the thermal levels and/or power levels of the processing unit to fit within a defined thermal or power range. After determining the parameter adjustment, the information handling system may adjust the parameter of the electronic device in accordance with the determination. For example, the adjustment may include adjusting a brightness for the mobile device; a frame rate for the television; or a power profile of a laptop. By adjusting the parameter related to the thermal and/or power limits of the processing unit, the information handling system may optimize the thermal design power of the processing unit. For example, an information handling systems with a built-in screen may determine an adjustment to the brightness of a screen, or determine an adjustment to the frame rate of the built-in screen or external display. The parameter adjustment may provide more headroom in thermal limitations or power limitations in a processing unit or system configuration. These example embodiments describe and illustrate various functionalities of an information handling system that may adjust a parameter related to the thermal levels and/or power levels of a processing unit in order to optimize a thermal design power of the processing unit. In some example embodiments, the adjustments control display parameters of various displays coupled to the information handling system when the system is coupled to an external display to compensate for the extra load, and resulting thermal increase, from driving the external display.

FIG. 1 illustrates a system configuration 100 with an information handling system according to some embodiments. The information handling system (IHS) 102 may be a laptop. The IHS 102 may be connected to a docking station 104, a first external monitor 106, and a second external monitor 108. The IHS 102 may be coupled via a wired or wireless connection 126 to the docking station 104. The docking station 104 may be coupled via a wired or wireless connection 128 to the first external monitor 106 to mirror, extend, and/or replace an internal display 120 of the laptop 102 and/or second external monitor 108 to mirror, extend, and/or replace the internal display 120. In some embodiments, the IHS 102 may be coupled to the external monitors 106 and 108 without the docking station 104. The GPU of the IHS 102 may drive a first external display 122 and/or a second external display 124. In certain embodiments, the system configuration 100 may include two or more discrete GPUs to drive integrated graphics on N displays or include a single discrete GPU to drive the N displays, and/or include a GPU embedded in a CPU to drive one or more displays.

When a user interacts with the IHS 102 and opens a menu 110 to launch a target application 112, the IHS 102 may monitor the user interaction with rendered windows. Rendered windows may include the target or a non-target application, active or inactive applications, and/or programs executing on the IHS 102. The IHS 102 may collect data from the user interaction with the target application 112 or other applications 114, 116, 118 on the first display 106. In some embodiments, data regarding user interaction may be collected from application programming interfaces (API) accessed during rendering of windows for applications 112, 114, 116, and 118. A target application 112 that is the priority application for a user may be identified by user interaction with the IHS 102. For example, the target application may be determined from data collected regarding the rendered windows for applications 112, 114, 116, and 118, the docking station 104, and related wired or wireless connections, the first external monitor 106, and/or the second external monitor 108. The IHS 102 may further monitor a camera 130, which may be used to perform eye tracking to identify a priority application from applications 112, 114, 116, and 118, such as by tracking a window on which the user's eye is focused. The IHS 102 may similarly monitor user input to a mouse 134, a keyboard 132, or any other suitable devices or components that may provide data regarding user interaction with the rendered windows. Further, the IHS 102 may monitor audio feedback from a microphone, such as measuring audio levels of noises from a user moving away or towards the laptop 102 or any other electronic device.

The IHS 102 may determine a parameter adjustment for the IHS 102, the docking station 104, the first external monitor 106, the second external monitor 108, and/or any other connected electronic device or component based on collected data from the user interaction with rendered windows. The parameter adjustment may be performed in response to an event on the IHS 102, such as a high temperature indication from a sensor in the IHS 102. The high temperature event indicates that power consumption in the IHS 102 is too high and should be reduced to improve user responsiveness. Responsiveness may refer to the speed with which an application corresponding to the rendered window is able to process the user input to the rendered window and update a display of the rendered window based on the user input. For example, processing the user input by the application may involve executing instructions on a central processing unit (CPU) and those instructions may be queued at the CPU with higher priority when the rendered window is prioritized to the user based on monitoring the user interaction with rendered windows to improve responsiveness of the rendered window. As another example, the refresh rate of a display presenting the rendered window may be maintained higher than other displays displaying rendered windows of lower priority to the user to improve responsiveness of the rendered window receiving the prioritized user interaction.

When such an event occurs, the IHS 102 may determine from the collected data that the user is working on the first external display 122 and not the second external display 124 or the internal display 120. The IHS 102 may then determine an adjustment for a display parameter such as the brightness of the internal display 120 to reduce power consumption and heat generation from the backlight of the internal display 120, which allows more power consumption by the CPU, GPU, or other circuitry in the IHS 102. The parameter adjustment may reduce the power consumption and temperature of the IHS 102 to reduce or prevent performance degradation. The parameter adjustment may impact the thermal design power of the IHS 102 or any other electronic device because the parameter adjustment may adjust the thermal and power level that the IHS 102 is capable of supporting for the processing unit. In some embodiments, the laptop 102 may also develop a user profile or processing unit characterization to assist in the calculation of the parameter adjustment. The processing unit characterization may include a profile on the GPU or the power unit such as details on the frame rate, capacity, thresholds, power state, battery levels, or other relevant information.

After determining the parameter adjustment, the IHS 102 may adjust the parameter of either the laptop 102, the docking station 104, the first external monitor 106, the second external monitor 108, and/or any other connected electronic device or component. In some embodiments, the IHS 102 may adjust a first parameter of the IHS 102 and a second parameter of the first external monitor 106 or another connected electronic device. In certain embodiments, the IHS 102 may adjust a first parameter of the first external monitor 106 and a second parameter of the second external monitor 108. For example, the IHS 102 may determine that the IHS 102 may reduce the power consumption of the IHS 102 by lowering the refresh rate of the first external monitor 106. The reduced power consumption for rendering frames at the lower refresh rate may allow more system resources to be allocated to execution of the target application 112 within the thermal design limits of the IHS 102.

In some embodiments, the IHS 102 may adjust parameters such as the display parameter, a GPU parameter, a CPU parameter, a power parameter, or any other parameter that may impact the thermal limits and/or power limits of the processing unit. For example, the laptop 102 may adjust the GPU parameter to directly or indirectly control a frame rate output of the IHS 102 or the display parameter for brightness or resolution for the internal display 120. The IHS 102 may further adjust parameters such as frame rate, clock control, brightness, refresh rate, resolution, volume setting, power state such as a power savings mode, and/or any other parameter to reduce power consumption and/or operation temperature(s). For example, the IHS 102 may adjust a power state or N power states of the IHS 102, the first external monitor 106, the second external monitor 108, and/or any other connected electronic device or component. The power savings mode or other power state may lower the operational temperature of the processing unit or the IHS 102. Reducing the operating temperature, for example, may allow the IHS 102 to reduce performance degradation and/or acoustic degradation by eliminating or reducing the use of a cooling fan that may cause processing delays or noise. In an IHS with multiple GPUs, parameters for each GPU may be separately adjusted based on a user's interaction with windows rendered by each of the GPUs. For example, in an IHS a first GPU may drive a first display and a second GPU may drive a second display. When the user interacts with rendered windows on the first display, the clock rate or other parameter relating to the second GPU may be decreased to maintain performance of the first GPU.

In certain embodiments, the IHS 102 may implement a feedback system for continuing to adjust parameters for allocating system resources within a thermal design limit of the IHS 102. For example, the IHS 102 may monitor the implemented parameter adjustments in addition to the user interaction with rendered windows and other data for additional, continuous optimization. Based on the adjustments in the system configuration 100, the IHS 102 may then determine an additional parameter adjustment for implementation by the IHS 102. For example after the power state of the first external monitor 106 changes to a low power state, the IHS 102 may determine, based on the user interaction, that the power state of the second external monitor 108 should be in a low power state as well. The IHS 102 may thus adjust the power parameter of the second external monitor 108. In some embodiments, the IHS 102 may not adjust the power parameter of the second external monitor 108 and may include the determined parameter adjustment in an additional determination. The IHS 102 may implement this self-learning feedback loop one or more times depending on the performance of the system configuration 100.

Figure 2:
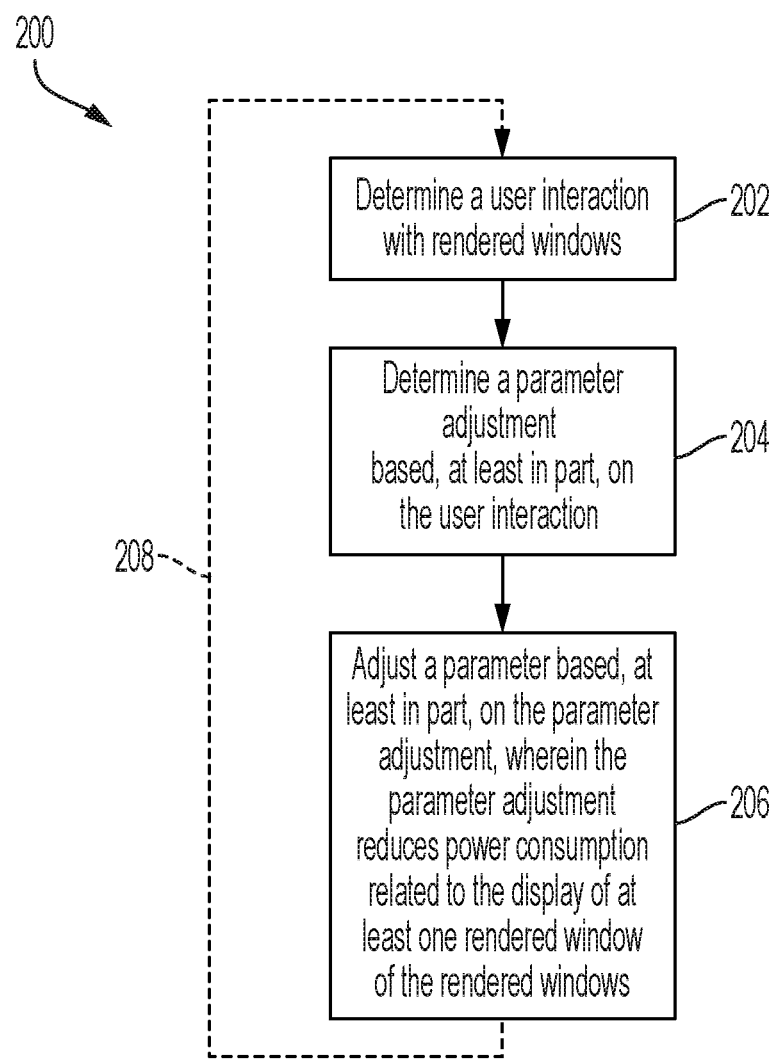
FIG. 2 is a flow chart illustrating the method of optimizing a thermal level and/or power level of a processing unit according to some embodiments of the disclosure.

A method 200 of optimizing a thermal levels and/or power levels within an IHS is shown in FIG. 2. The method 200 may include block 202 for determining, by an IHS, a user interaction with rendered windows by the IHS, such as by determining which display coupled to the IHS is receiving user input. In some embodiments, the determination may include determining eye focus, mouse movement, keyboard entry, appearance on camera, sounds received through microphones, and/or other interactions. In some embodiments, the IHS may collect other data from the information handling system and/or the electronic device such as temperature, noise levels, power consumption, active/inactive windows, operating system, and unused displays.

At block 204, the IHS determines a parameter adjustment based on the user interaction monitored at block 202. The parameter adjusted may correspond to settings on the IHS or other components coupled to the IHS, such as external displays or external GPUs. In one example, the IHS may determine to decrease a refresh rate or frame rate on an external display to reduce power consumption by a GPU of the IHS, and provide thermal headroom on the IHS for increasing or maintaining performance of a CPU of the IHS. The determined decrease of refresh rate or frame rate on the external display may be based on a determination at block 202, that the user is primarily interacting with the internal display rather than the external display. In another example, the IHS may determine to decrease a brightness on an internal display to reduce power consumption by the IHS, and provide thermal headroom on the IHS for increasing or maintaining performance of a CPU or GPU of the IHS that is driving an external display. The determined decrease of brightness may be based on a determination at block 202, that the user is primarily interacting with the external display rather than the internal display. As a further example, a mobile device may determine to reduce the bitrate of audio played back through an audio system be determining that the user is not interacting with the window that is generating the audio based on the determination at block 202. In certain embodiments, the step of determining of method 200 may include the information handling system profiling the user and/or characterizing the processing unit(s) in the information handling system or the electronic device(s) in the system configuration. In another embodiment, method 200 may further include the information handling system determining the user interaction with rendered windows, the other data from the information handling system and/or other electronic devices or components, and the previous parameter adjustment.

In some embodiments, the information handling system may include intelligence from components connected to the information handling system to leverage collected data from a multi-device system configuration. By combining artificial intelligence and machine learning with the functions of determining the user interaction, monitoring data, determining the parameter adjustment, and adjusting the parameter, the information handling system may further optimize the thermal and power levels of the processing unit. In certain embodiments, the information handling system may implement a feedback loop and may adjust the steps of determining and adjusting. Adjusting the steps may allow the information handling system to capture data from various sources such as the prior parameter adjustment, profiles, characterizations, statuses, and/or modifications in the system. The information handling system may then implement additional parameter adjustments for the processing unit in the information handling system, the electronic device, or both.

The information handling system at block 206 of method 200 may adjust a parameter of one or more electronic devices such as the thermal or power level of a processing unit based on the parameter adjustment determination at block 204. For example, the parameter may adjust a thermal level and/or power level of the IHS by adjusting performance settings of the GPU, the CPU, or another component of the information handling system or a coupled electronic device or component. The information handling system may have an GPU and may be coupled to an external GPU. The information handling system may determine which GPU and related electronic device to adjust the parameter on. Distinguishing between two or more GPUs, devices, and/or components may be advantageous in optimizing the thermal and/or power limitations of the processing unit. In some embodiments, the method 200 may include a step to adjust the parameters of an electronic device differently from another electronic device by adjusting a first parameter of the one electronic device and a second parameter of the second electronic device. In another embodiment, the method 200 may include a step to adjust the parameters of a first monitor differently from a second monitor by adjusting a first parameter of the first monitor and a second parameter of the second monitor.

Figure 3:
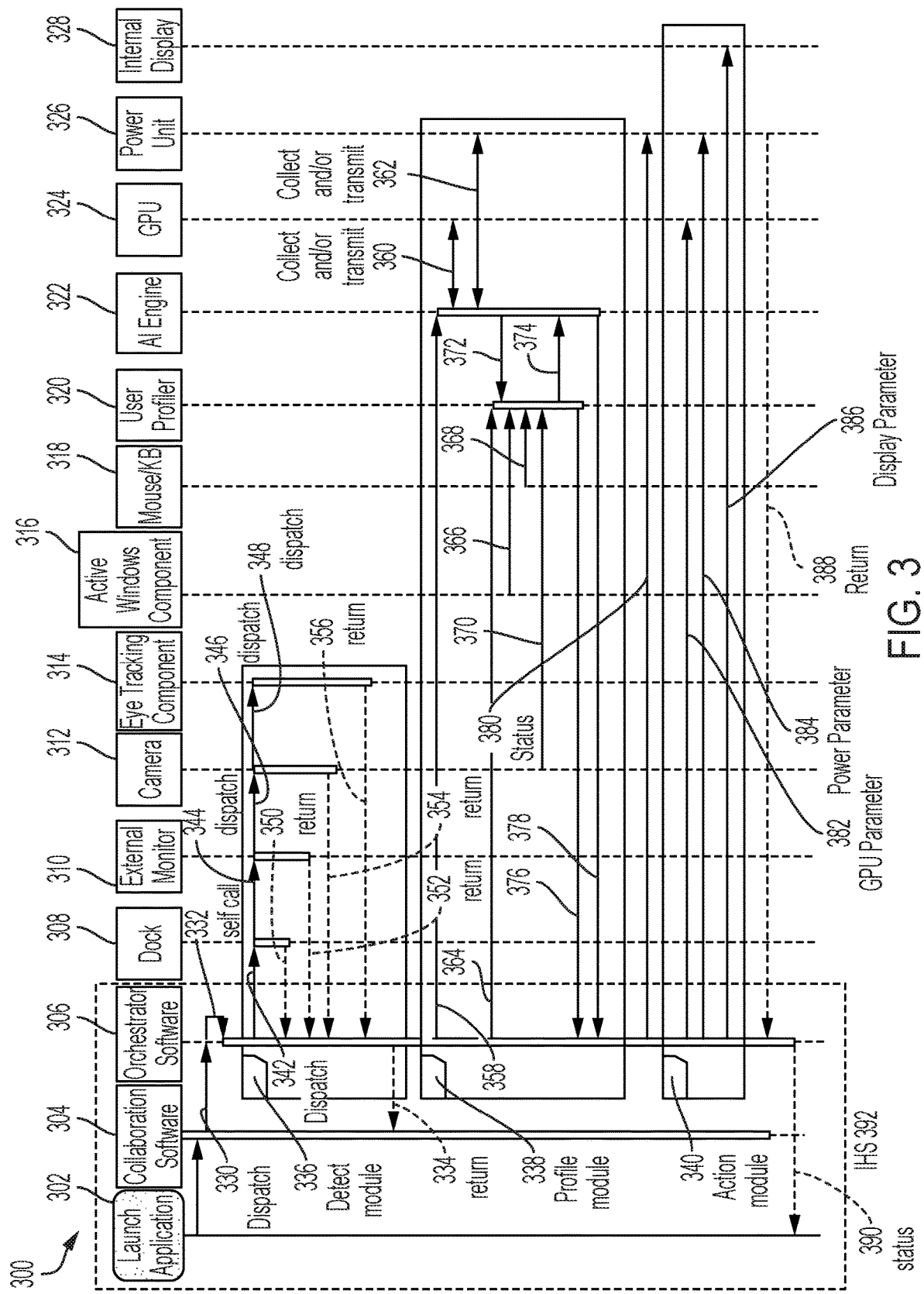
FIG. 3 is a sequence flow chart to optimizing a thermal level and/or power level of a processing unit according to some embodiments of the disclosure.

FIG. 3 illustrates a sequence flow chart 300 for adjusting parameters based on user interaction according to some embodiments of this disclosure. The information handling system (IHS) may execute a collaborator software 304 and/or an orchestrator software 306 to determine user interaction, determine a parameter adjustment, and adjust a parameter that may adjust the thermal and/or power level within an IHS. When a user launches a target application 302, the IHS 392 may initiate the collaborator software 304. The collaborator software 304 may dispatch 330 a step to the orchestrator software 306 to initiate self-call 332 and to further initiate a detect module 336. The detect module 336 may detect and/or monitor various electronic devices or components including, but not limited to, a dock 308, an external monitor 310, a camera 312 that may perform eye tracking, and an eye tracking component 314. After the self-call 332, the IHS 392 may dispatch 342 a data request to the dock 308 that may return 350 data such as type of connections, system configuration, or other information. Then, the detect module 336 of the IHS 392 may dispatch 344 a data request to the external monitor 310, which may return 352 data such as display data including, but not limited to, brightness, power consumption, and other data. The detect module 336 may dispatch 346 a data request to the camera 312. The camera 312 may return 354 data regarding user behaviors such as the type of use, frequency of use, rate of change, eye movement, or proximity. The detect module 336 may dispatch 348 another data request to the eye tracking component 314 that may be configured, for example, to detect eye movement between multiple devices and to return 356 data regarding the user interaction with rendered windows. The orchestrator software 306 may return 334 the data monitored and collected in the detect module 336 to the collaborator software 304. For example, the IHS 392 may detect and monitor inactive applications on the external monitor 310, an internal display 328, or any other suitable device using the orchestrator software 306 in conjunction with the collaborator software 304.

The IHS 392 may initiate a profile module 338 with user interaction data regarding the rendered windows and/or other data. The orchestrator software 306 through the profile module 338 may work with a user profiler 320 to determine a parameter adjustment. The profile module 338 may transmit 364 data such as data from the detect module 336 to the user profiler 320. The user profiler 320 may gather additional data transmitted 366 from an active windows component 316, data transmitted 368 from a mouse and/or keyboard 318, and/or data transmitted 370 from the camera 312, the eye tracking component 314, or both. The user profiler 320 may return 376 data for determining the parameter adjustment. The profile module 338 may also transmit 358 data such as the data monitored and collected from the detect module 336 to the artificial intelligence (AI) engine 322. The AI engine 322 may be connected to a GPU 324 to collect and/or transmit 360 GPU data between the AI engine 322 and the GPU 324. The profile module 338 may also characterize the GPU 324 or another processing unit using the AI engine 322, the user profiler 320, and/or another mechanism. The characterization of the processing unit such as the GPU 324 may include a thermal design power, the thermal levels, the power levels, a power state, and/or other data. The AI engine 322 may be further connected to a power unit 326 that may collect and/or transmit 362 power data between the AI engine 322 and the power unit 326. The data collected and/or transmitted 362 may include the power characteristics of a central processing unit (CPU) versus the system configuration, a power ratio of the CPU, or other data. The bi-directional flow of data between the AI engine 322, the GPU 324, and/or the power unit 326 may allow the AI engine 322 to continuously update data and transmit 372 data to the user profiler 320 that may also transmit 374 data to the AI engine 322. Furthermore, the AI engine 322 may return 378 data to the profile module 338 for determining the parameter adjustment.

The profile module 338 may include at least one or more feedback loops such as the communication between the profile 338 module with the user profiler 320 and/or the AI engine 322. The AI engine 322 may also transmit 372 the detect module 336 data to the user profiler 320. In some embodiments, the IHS may include intelligence from components coupled to the information handling system to leverage collected data from a multi-device system configuration. The AI engine 322 may also transmit data to the orchestrator software 306, which may include information regarding past usage of the IHS and various rendered windows, predicted usage of the IHS and rendered windows, and/or recommendations for adjustments to the parameters controlling the IHS. The recommendations for adjustments may be based on an artificial intelligence system trained using data collected by the AI engine 322 based on data collected by the detect module 336 and/or data profiles formed by the profile module 338. In an IHS with multiple GPUs, the AI engine 322 may also handle partial handling of a graphics load of the IHS (such as by controlling compute operations on a first GPU and controlling render operations on a second GPU). The AI engine 322 may take control the parameters of the GPUs based on an assessment for each GPU. By combining artificial intelligence and machine learning with the functions of determining the user interaction, monitoring data, determining the parameter adjustment, and adjusting the parameter, the information handling system may further optimize the thermal and power levels of the processing unit. In certain embodiments, the information handling system may implement a feedback loop including the determining and adjusting of system parameters. In some embodiments, machine learning models may include logistic regression techniques, linear discriminant analysis, linear regression analysis, artificial neural networks, machine learning classifier algorithms, or classification/regression trees. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received environmental data, and a system or environmental characteristic and/or a degree to which such an influencing attribute affects the outcome of such a system or environmental characteristic.

The IHS 392 may determine, based on the user interaction with at least rendered windows, the parameter adjustment for either the IHS 392 and/or another electronic device or component in the system configuration. The orchestrator software 306 may send a status 380 about the parameter adjustment, user profile(s) and/or processing unit characterizations to the power unit 326. The IHS 392 may then initiate an action module 340 that implements the determined parameter adjustment. The action module 340 may adjust a display parameter 386 of the internal display 328. For example, the server may determine that the brightness of the internal display 328 may be lowered to reduce the power consumption in the IHS. In some embodiments, the action module 340 may include adjusting the display parameter 386 of the external monitor 310, another monitor, and/or N monitors. The action module 340 may further adjust a GPU parameter 382 of the GPU 324. In certain embodiments, the information handling system may interact with one or N GPUs and may adjust the GPU parameter 382 of another GPU that is driving the integrated graphics in a multi-device system configuration. The action module 340 may also adjust a power parameter 384 of the power unit 326.

In some embodiments, the parameter adjustments such as 382, 384, and/or 386 may further include any other parameter adjustment. The display parameter 386 may include, but is not limited to, a refresh rate or brightness. The GPU parameter 382 may include, but is not limited to, clock control or frame rate. The power parameter 384 may include, but is not limited to, a power state(s) or power ratio. In certain embodiments, the IHS 392 may adjust a first parameter of a first electronic device such as the camera 312 and/or a second parameter of a second electronic device such as the GPU 324. In some embodiments, the action module 340 may include adjusting a first parameter of a first monitor such as the external monitor 310 and a different second parameter of another monitor connected to the system.

After the parameter adjustment, the power unit 326 may return 388 data related the parameter adjustment and/or other data from the IHS 392 or other electronic devices or components in the sequence flow chart 300 to the orchestrator software 306. The orchestrator software may further transmit 390 the status and/or any other data to the launched target application 302 or another component of the IHS 392. In some embodiments, the IHS 392 may further detect and monitor the parameter adjustments such as 382, 384, and 386 and/or the user interaction with rendered windows to re-determine an updated parameter adjustment to implement in the system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 4:
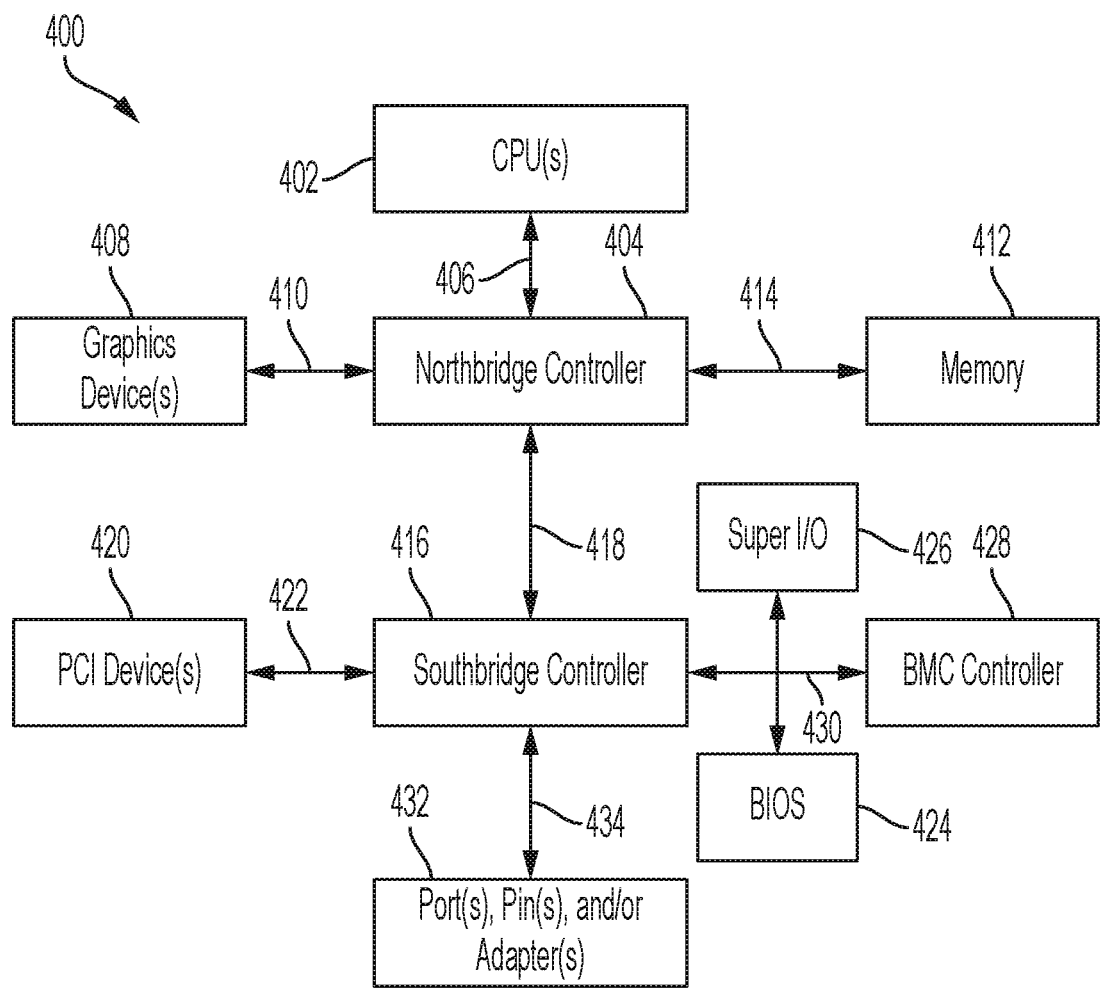
FIG. 4 is a schematic block diagram of an example information handling system according to some embodiments of the disclosure.

An information handling system may include a variety of components to generate, process, display, manipulate, transmit, and receive information. One example of an information handling system 400 is shown in FIG. 4. IHS 400 may include one or more central processing units (CPUs) 402. In some embodiments, IHS 400 may be a single-processor system with a single CPU 402, while in other embodiments IHS 400 may be a multi-processor system including two or more CPUs 402 (e.g., two, four, eight, or any other suitable number). CPU(s) 402 may include any processor capable of executing program instructions. For example, CPU(s) 402 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 402 may commonly, but not necessarily, implement the same ISA.

CPU(s) 402 may be coupled to northbridge controller or chipset 404 via front-side bus 406. The front-side bus 406 may include multiple data links arranged in a set or bus configuration. Northbridge controller 404 may be configured to coordinate I/O traffic between CPU(s) 402 and other components. For example, northbridge controller 404 may be coupled to graphics device(s) 408 (e.g., one or more video cards or adaptors, etc.) via graphics bus 410 (e.g., an Accelerated Graphics Port or AGP bus, a Peripheral Component Interconnect or PCI bus, etc.). Northbridge controller 404 may also be coupled to system memory 412 via memory bus 414. Memory 412 may be configured to store program instructions and/or data accessible by CPU(s) 402. In various embodiments, memory 412 may be implemented using any suitable memory technology, such as static RAM (SRAM), synchronous dynamic RAM (SDRAM), nonvolatile/Flash-type memory, or any other type of memory.

Northbridge controller 404 may be coupled to southbridge controller or chipset 416 via internal bus 418. Generally, southbridge controller 416 may be configured to handle various of IHS 400's I/O operations, and it may provide interfaces such as, for instance, Universal Serial Bus (USB), audio, serial, parallel, Ethernet, etc., via port(s), pin(s), and/or adapter(s) 432 over bus 434. For example, southbridge controller 416 may be configured to allow data to be exchanged between IHS 400 and other devices, such as other IHS s attached to a network. In various embodiments, southbridge controller 416 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 416 may also enable connection to one or more keyboards, keypads, touch screens, scanning devices, voice or optical recognition devices, or any other devices suitable for entering or retrieving data. Multiple I/O devices may be present in IHS 400. In some embodiments, I/O devices may be separate from IHS 400 and may interact with IHS 400 through a wired or wireless connection. As shown, southbridge controller 416 may be further coupled to one or more PCI devices 420 (e.g., modems, network cards, sound cards, video cards, etc.) via PCI bus 422. Southbridge controller 116 may also be coupled to Basic I/O System (BIOS) 424, Super I/O Controller 426, and Baseboard Management Controller (BMC) 428 via a Low Pin Count (LPC) bus 430.

IHS 400 may be configured to access different types of computer-accessible media separate from memory 412. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 400 through various interfaces, such as universal serial bus (USB) interfaces, via northbridge controller 404 and/or southbridge controller 416. Some such mediums may be coupled to the IHS through a Super I/O Controller 426 combines interfaces for a variety of lower bandwidth or low data rate devices. Those devices may include, for example, floppy disks, parallel ports, keyboard and mouse and other user input devices, temperature sensors, and/or fan speed monitoring.

BIOS 424 may include non-volatile memory having program instructions stored thereon. The instructions stored on the BIOS 424 may be usable by CPU(s) 402 to initialize and test other hardware components. The BIOS 424 may further include instructions to load an Operating System (OS) for execution by CPU(s) 402 to provide a user interface for the IHS 400, with such loading occurring during a pre-boot stage. In some embodiments, firmware execution facilitated by the BIOS 424 may include execution of program code that is compatible with the Unified Extensible Firmware Interface (UEFI) specification, although other types of firmware may be used.

BMC controller 428 may include non-volatile memory having program instructions stored thereon that are usable by CPU(s) 402 to enable remote management of IHS 400. For example, BMC controller 428 may enable a user to discover, configure, and/or manage BMC controller 428. Further, the BMC controller 428 may allow a user to setup configuration options, resolve and administer hardware or software problems, etc. Additionally or alternatively, BMC controller 428 may include one or more firmware volumes, each volume having one or more firmware files used by the BIOS firmware interface to initialize and test components of IHS 400.

One or more of the devices or components shown in FIG. 4 may be absent, or one or more other components may be added. Further, in some embodiments, components may be combined onto a shared circuit board and/or implemented as a single integrated circuit (IC) with a shared semiconductor substrate. For example, northbridge controller 404 may be combined with southbridge controller 416, and/or be at least partially incorporated into CPU(s) 402. Accordingly, systems and methods described herein may be implemented or executed with other computer system configurations. In some cases, various elements shown in FIG. 4 may be mounted on a motherboard and enclosed within a chassis of the IHS 400.

The schematic flow chart diagrams of FIG. 2 and FIG. 4 are generally set forth as a logical or sequential flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or determination period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can include random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   determining, by an information handling system with at least one internal display comprising a first monitor, whether the information handling system is coupled to a docking station and at least one external display comprising a second monitor through the docking station; and
   when the information handling system is determined to be coupled to the docking station and the at least one external display:
      determining, by the information handling system, a user interaction with rendered windows on the at least one internal display and the at least one external display;
      determining, by the information handling system, a parameter adjustment for at least one of the at least one internal display or the at least one external display based, at least in part, on the user interaction; and
      adjusting, by the information handling system, a parameter based, at least in part, on the parameter adjustment, wherein the parameter adjustment reduces power consumption related to the display of at least one rendered window of the rendered windows on at least one of the at least one internal display or the at least one external display.

2. The method of claim 1, wherein determining the parameter adjustment comprises determining a parameter adjustment to maintain responsiveness of a first rendered window of the rendered windows by reducing responsiveness of a second rendered window of the rendered windows based on the user interaction indicating a user is interacting with the first rendered window, and wherein the reducing responsiveness of the second rendered window reduces power consumption related to the display of the second rendered window.

3. The method of claim 2, wherein the step of adjusting, by the information handling system, comprises adjusting a second parameter of a second monitor displaying the second rendered window differently from a first parameter of a first monitor displaying the first rendered window.

4. The method of claim 3, wherein the second parameter comprises a second refresh rate of the second monitor, wherein adjusting the second parameter reduces the second refresh rate below a first refresh rate of the first monitor, and wherein the adjusting the second refresh rate reduces power consumption related to the display of the second rendered window.

5. The method of claim 1, wherein adjusting the parameter comprises adjusting a first brightness level of a first monitor based on a determination that the user interaction with a first rendered window displayed on the first monitor is less than the user interaction with a second rendered window displayed on a second monitor, and wherein the first monitor comprises an internal display of the information handling system and the parameter adjustment reduces power consumption related to the display of the second monitor.

6. The method of claim 1, wherein adjusting, by the information handling system, the parameter comprises adjusting a parameter for a graphics processing unit (GPU), wherein the parameter controls at least one of a frame rate or a clock rate of the GPU.

7. The method of claim 1, wherein determining the user interaction comprises monitoring a camera to determine whether a user's eye is not focused on a first rendered window of the rendered windows, and wherein the adjusting of the parameter comprises adjusting the parameter to reduce power consumption related to the display of the first rendered window.

8. An information handling system comprising:
   a memory; and
   a processor coupled to the memory, wherein the processor is configured to perform the steps comprising:
      determining, by an information handling system with at least one internal display comprising a first monitor, whether the information handling system is coupled to a docking station and at least one external display comprising a second monitor through the docking station; and
      when the information handling system is determined to be coupled to the docking station and the at least one external display:
         determining, by the information handling system, a user interaction with rendered windows on the at least one internal display and the at least one external display;
         determining, by the information handling system, a parameter adjustment for at least one of the at least one internal display or the at least one external display based, at least in part, on the user interaction; and
         adjusting, by the information handling system, a parameter based, at least in part, on the parameter adjustment, wherein the parameter adjustment reduces power consumption related to the display of at least one rendered window of the rendered windows on at least one of the at least one internal display or the at least one external display.

9. The information handling system of claim 8, wherein determining the parameter adjustment comprises determining a parameter adjustment to maintain responsiveness of a first rendered window of the rendered windows by reducing responsiveness of a second rendered window of the rendered windows based on the user interaction indicating a user is interacting with the first rendered window, and wherein the reducing responsiveness of the second rendered window reduces power consumption related to the display of the second rendered window.

10. The information handling system of claim 9, wherein the step of adjusting, by the information handling system, comprises adjusting a second parameter of a second monitor displaying the second rendered window differently from a first parameter of a first monitor displaying the first rendered window.

11. The information handling system of claim 10, wherein the second parameter comprises a second refresh rate of the second monitor, wherein adjusting the second parameter reduces the second refresh rate below a first refresh rate of the first monitor, and wherein the adjusting the second refresh rate reduces power consumption related to the display of the second rendered window.

12. The information handling system of claim 8, wherein adjusting the parameter comprises adjusting a first brightness level of a first monitor based on a determination that the user interaction with a first rendered window displayed on the first monitor is less than the user interaction with a second rendered window displayed on a second monitor, and wherein the first monitor comprises an internal display of the information handling system.

13. The information handling system of claim 8, wherein adjusting, by the information handling system, the parameter comprises adjusting a parameter for a graphics processing unit (GPU), wherein the parameter controls at least one of a frame rate or a clock rate of the GPU.

14. The information handling system of claim 8, wherein determining the user interaction comprises monitoring a camera to determine whether a user's eye is not focused on a first rendered window of the rendered windows, and wherein the adjusting of the parameter comprises adjusting the parameter to reduce power consumption related to the display of the first rendered window.

15. A computer program product, comprising:
a non-transitory computer readable medium comprising instructions for causing an information handling system to perform steps comprising:
determining, by an information handling system with at least one internal display comprising a first monitor, whether the information handling system is coupled to a docking station and at least one external display comprising a second monitor through the docking station; and
when the information handling system is determined to be coupled to the docking station and the at least one external display:
determining, by the information handling system, a user interaction with rendered windows on the at least one internal display and the at least one external display;
determining, by the information handling system, a parameter adjustment for at least one of the at least one internal display or the at least one external display based, at least in part, on the user interaction; and
adjusting, by the information handling system, a parameter based, at least in part, on the parameter adjustment, wherein the parameter adjustment reduces power consumption related to the display of at least one rendered window of the rendered windows on at least one of the at least one internal display or the at least one external display.

16. The computer program product of claim 15, wherein determining the parameter adjustment comprises determining a parameter adjustment to maintain responsiveness of a first rendered window of the rendered windows by reducing responsiveness of a second rendered window of the rendered windows based on the user interaction indicating a user is interacting with the first rendered window, and wherein the reducing responsiveness of the second rendered window reduces power consumption related to the display of the second rendered window.

17. The computer program product of claim 16, wherein the step of adjusting, by the information handling system, comprises adjusting a second parameter of a second monitor displaying the second rendered window differently from a first parameter of a first monitor displaying the first rendered window.

18. The computer program product of claim 17, wherein the second parameter comprises a second refresh rate of the second monitor, wherein adjusting the second parameter reduces the second refresh rate below a first refresh rate of the first monitor, and wherein the adjusting the second refresh rate reduces power consumption related to the display of the second rendered window.

19. The computer program product of claim 15, wherein adjusting the parameter comprises adjusting a first brightness level of a first monitor based on a determination that the user interaction with a first rendered window displayed on the first monitor is less than the user interaction with a second rendered window displayed on a second monitor, and wherein the first monitor comprises an internal display of the information handling system.

20. The computer program product of claim 15, wherein determining the user interaction comprises monitoring a camera to determine whether a user's eye is not focused on a first rendered window of the rendered windows, and wherein the adjusting of the parameter comprises adjusting the parameter to reduce power consumption related to the display of the first rendered window.

* * * * *